United States Patent [19]
Rice et al.

[11] 3,917,986
[45] Nov. 4, 1975

[54] METALLIZED WOUND CAPACITOR WITH EDGE METALLIZATION

[75] Inventors: Ronald B. Rice, Fairfax; John P. Uhl, Arlington, both of Va.

[73] Assignee: Illinois Tool Works Inc., Chicago, Ill.

[22] Filed: Nov. 1, 1974

[21] Appl. No.: 519,959

[52] U.S. Cl. .............................................. 317/260
[51] Int. Cl.² .......................................... H01G 4/32
[58] Field of Search ................................. 317/260

[56] References Cited
UNITED STATES PATENTS
3,482,154  12/1969  Robinson .......................... 317/260

Primary Examiner—E. A. Goldberg
Attorney, Agent, or Firm—Robert W. Beart; Glenn W. Bowen

[57] ABSTRACT

Metallized dielectric film capacitors which may be wound either from the end, the center, or an intermediate point are disclosed. In one version of the capacitor, two dielectric film layers of polyester, polycarbonate, or other suitable dielectric material which are metallized on both sides and on their edges and which have an elongated insulating strip on both sides of the metallized film are wound together to form the capacitor. In a second embodiment, the two metallized layers are alternately stacked with two dielectric layers which are metallized on their edges and these layers are then wound to form the capacitor.

2 Claims, 15 Drawing Figures

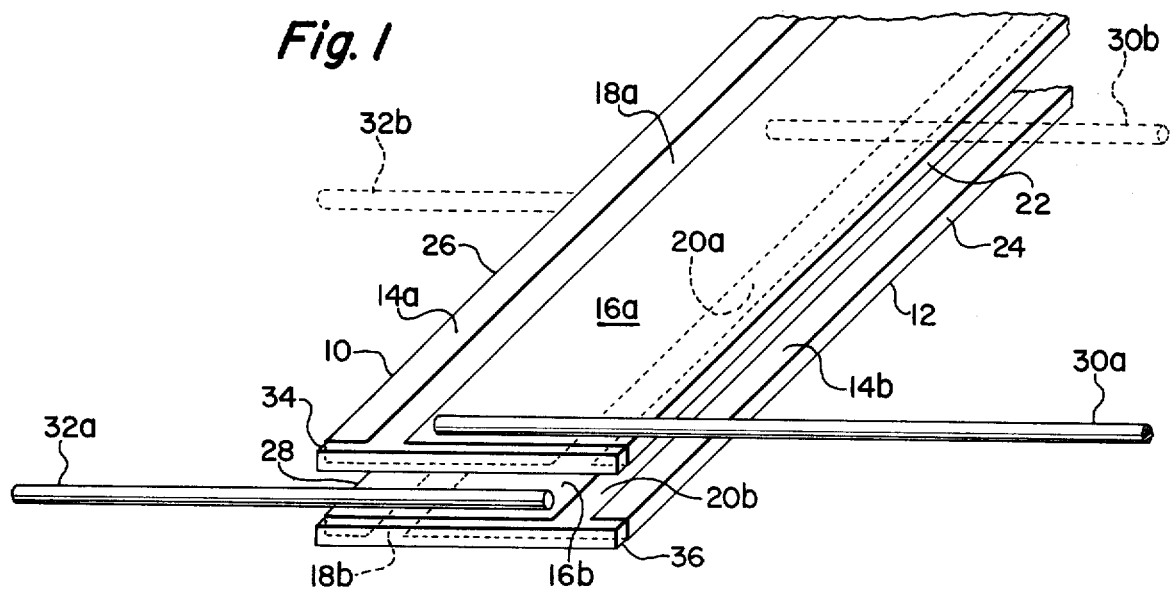
Fig. 1
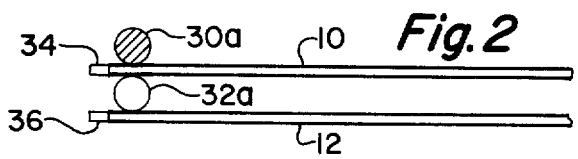
Fig. 2
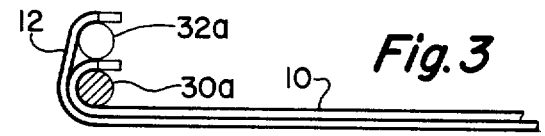
Fig. 3
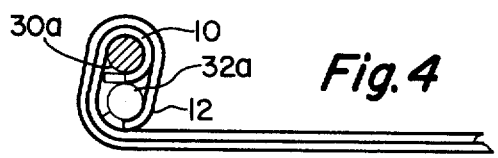
Fig. 4
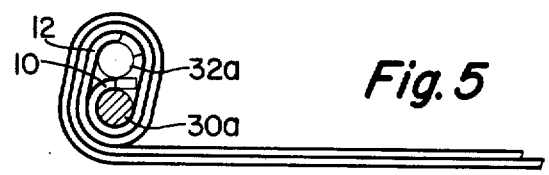
Fig. 5
Fig. 6
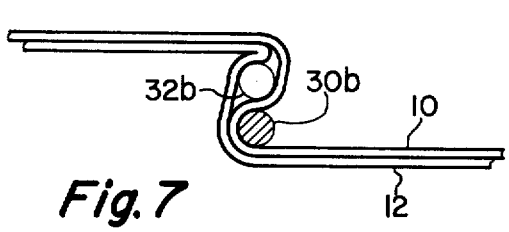
Fig. 7
Fig. 8

3,917,986

METALLIZED WOUND CAPACITOR WITH EDGE METALLIZATION

BACKGROUND OF THE INVENTION

Insulating dielectric films, such as polyester, polycarbonate and other suitable material, are utilized to form capacitors by applying a metallized layer on both sides of the capacitor and then by either winding them from the center of the capacitor, as shown in the Peck U.S. Pat. No. 2,887,649; or from the end, as shown in the Dubilier U.S. Pat. No. 1,870,949. It is desirable, however, to have the capability of producing a capacitor with either an end winding machine or a center winding machine without modification of the configuration of the layers that make up the capacitor, since many capacitor manufacturers have both types of winding machines in their plant.

It is, therefore, an object of the present invention to provide a wound capacitor which may be formed either by a center winding or an end winding operation.

A significant problem that arises with conventional metallized layer capacitors is that they are metallized only on their flat surface areas and not on their edges so that once the capacitor has been wound, a conductive metal, such as aluminum, must be sprayed on the ends of the capacitor in order to short out the ends of the windings to reduce the resistance of the capacitor to an accpetable level. This spraying operation requires a relatively large amount of plant space which must be sealed off because of the resulting noise and air contamination; and, therefore, this is a relatively expensive operation.

It is, therefore, another object of the present invention to provide a metallized capacitor which does not require an end spray metallization operation in order to reduce the resistance of the capacitor after it has been wound.

DESCRIPTION OF THE DRAWINGS

The invention is shown by reference to the following drawings in which:

FIG. 1 shows an embodiment of the present invention which utilizes two metallized dielectric layers;

FIG. 2 is an edge view of the metallized layers of FIG. 1 prior to the winding of an end wound capacitor;

FIG. 3 is an edge view of the end wound capacitor of FIG. 2 after the leads have been wound about 180°;

FIG. 4 is an edge view of the end wound capacitor of FIG. 2 after the winding has progressed 360°;

FIG. 5 is an edge view of the winding of the end wound capacitor of FIG. 2 after the leads have been rotated about 540°;

FIG. 6 is an edge view of the metallized layers of FIG. 1 prior to winding of a center wound capacitor;

FIG. 7 is an edge view of the center wound capacitor of FIG. 6 after the leads have been rotated 180°;

FIG. 8 is an edge view of the center wound capacitor of FIG. 6 after the leads have been wound 360°;

TECHNICAL DESCRIPTION OF THE INVENTION

Figure 9:
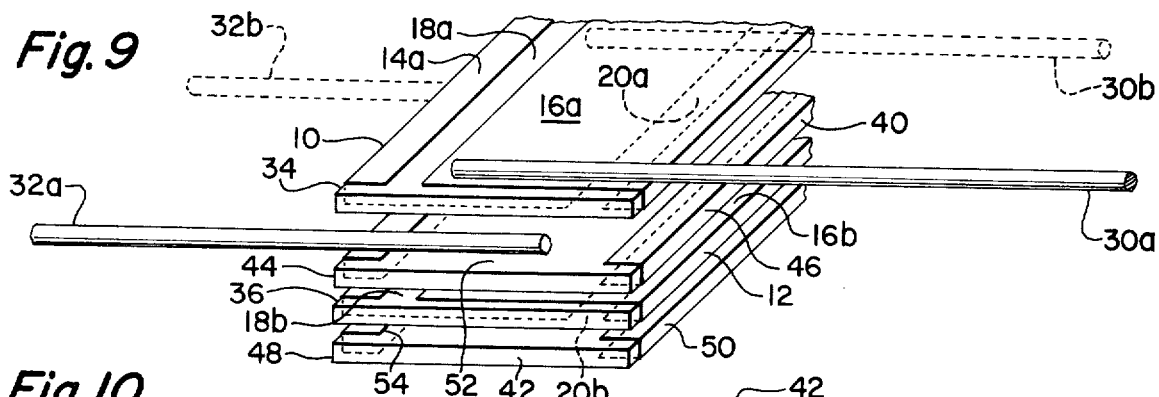
FIG. 9 shows an embodiment of the present invention which utilizes four metallized dielectric layers, with two of the dielectric layers having metallization configuration and two other dielectric layers having metallization configuration.

Capacitors are formed in accordance with the present invention by utilizing elongated dielectric layers of approximately the same size, such as the layers 10, 12 of FIG. 1. The layers 10, 12 may be formed of polyester, polycarbonate or other suitable material, and they have a surface metallization pattern consisting of two portions 14a, 16a on the dielectric layer 10 and two portions 14b, 16b on the dielectric layer 12. The metallized portions may be formed by thin films deposited on the dielectric layers. They are shaped so that the upper surfaces of the metallized portions 16a, 16b overlap each other while the lower surfaces of the metallized portions 14a, 14b overlap each other. It is seen from FIG. 1 that the portions 14a, 14b and the portions 16a, 16b are corresponding areas of similar configurations, but that they are positioned on opposite edges of the capacitor.

Metallization of the portions 16a, 14b extends over the edges 22, 24 on the righthand side of the layers 10, 12, respectively. Metallization of the portions 14a, 16b extends over the edges 26, 28 on the lefthand side of the layers 10, 12, respectively. An unmetallized upper dielectric strip 18a of the film layer 10 separates the upper part of the metallized sections 14a, 16a, and a corresponding lower dielectric strip 10a on the dielectric layer 10 separates the lower part of the metallized sections 14a, 16a. In a similar manner, an unmetallized dielectric strip 10b on the film layer 12 separates the upper part of the metallized sections 16b, 14b while the corresponding dielectric strip 18b on the film layer 12 separates the lower part of the metallized sections 14b, 16b.

A capacitor constructed in accordance with the present invention is formed by winding the layers 10, 12 about the leads of the capacitor. In FIG. 1, the leads 30a, 32a are shown in full-line representation for an end wound capacitor. However, it is noted that the leads may also be positioned at the center of the capacitor or at an intermediate point between the center and the ends of the dielectric layers for a center wound capacitor. The leads 30b, 32b, which are represented by the dotted-line representation in FIG. 1, illustrate the position of the leads of a center wound capacitor. The term "center wound," as used in this application, is intended to encompass capacitors that are wound with the leads initially positioned either at the center or at an intermediate point between the ends and the center of the dielectric layers which is not sufficiently adjacent to one end of the capacitor to produce an end wound capacitor, as described herein. The term "end wound" is, therefore, intended to encompass capacitors that are wound with the leads initially positioned adjacent to one end of the capacitor.

If an end wound capacitor is to be formed with the layer configuration of FIG. 1, the leads 30a, 32a will be initially positioned, as shown in the edge view of FIG.

2. The leads are then wound in a clockwise direction, as shown in FIGS. 3 through 5. FIG. 3 shows the winding of the end wound capacitor after the leads have been rotated 180°. FIG. 4 shows the winding after the leads have been wound 360°, and FIG. 5 shows the winding after the leads have been rotated 540°. As shown in FIG. 1, it may be desirable to have a small unmetallized area, such as the area 34 of the film 10 and the area 36 of the film 12, at the ends of the layers 10, 12 in order to prevent shorting of an end wound capacitor. Alternately, a dielectric insulating strip could be placed in the capacitor and wound into it so as to avoid shorting out the initial portions of the winding of an end wound capacitor.

Another version of a capacitor which is constructed in accordance with the present invention and may be wound from either the end or from the center is shown in FIGS. 9 through 15. The same element numbers that were utilized in FIGS. 1 through 8 are employed in the discussion of FIGS. 9 through 15 for convenience. The embodiment of FIG. 9, however, utilizes two additional dielectric layers 40, 42 of approximately the same size as the layers 10, 12. The dielectric layer 40 is metallized along its edges to provide the metallized portions 44, 46 and the dielectric layer 42 is metallized along its edges to provide the metallized portions 48, 50. The dielectric film layers 40, 42 may be constructed of the same polyester, polycarbonate or other material that forms the layers 10, 12; or, alternately, the material of the layers 40, 42 could be of a different material than the layers 10, 12. It is to be noted that in the construction of FIG. 9, the layers 10, 12 are oriented in the same direction, rather than as shown in FIG. 1, so that the dielectric strips 18a, 18b are in alignment with each and are on top of the layers 10, 12, respectively; and so that the dielectric stripes 20a, 20b are also aligned with each other and are on the bottom of the layers 10, 12, respectively.

Figure 10:
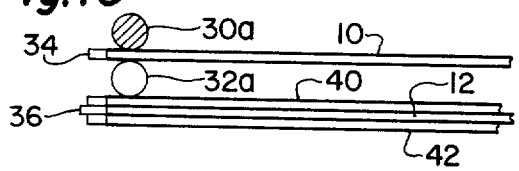
FIG. 10 is an edge view of the layers of FIG. 9 prior to the winding of an end wound capacitor.
Figure 11:
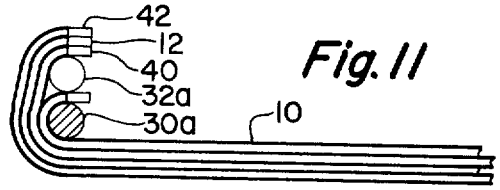
FIG. 11 is an edge view of the end wound capacitor of FIG. 10 after the leads have been rotated 180°.
Figure 12:
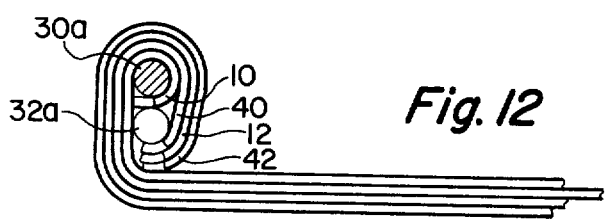
FIG. 12 is an edge view of the end wound capacitor of FIG. 10 after the leads have been wound about 360°.

A capacitor having a layered construction, as shown in FIG. 9, may also be wound from either the end or from the center of the layers, or from an intermediate point between the end and the center. If the capacitor is to be wound from the end, the winding will proceed as shown in FIGS. 10 through 12. The end areas 34, 36 of the layers 10, 12 may again be unmetallized in order to prevent shorting for the end wound capacitor of FIGS. 10 through 12. If the capacitor is to be constructed in accordance with the layers of FIG. 9 by the use of a center winding technique, the end areas may be metallized. Similarly, the end areas 52, 54 of the dielectric layers 40, 42 may be left unmetallized for end wound capacitors in order to prevent shorting. The dielectric layer 10 is positioned between the leads 30b, 32b and the layers 12, 40 and 42 are positioned below the leads 32b. FIG. 11 shows the end wound capacitor of FIG. 10 after the leads have been wound 180°, and FIG. 12 shows the winding after a 360° rotation of the leads has occurred.

Figure 13:
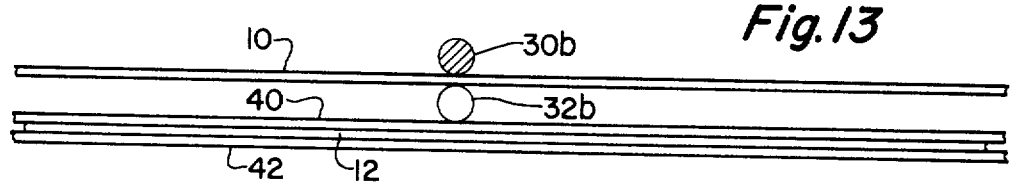
FIG. 13 is an edge view of the layers of FIG. 9 prior to the winding of a center wound capacitor.
Figure 14:
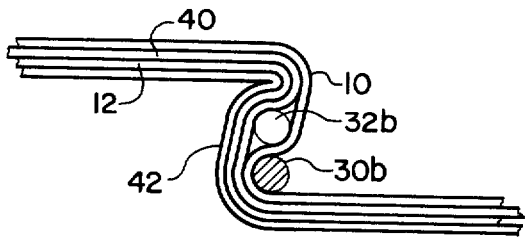
FIG. 14 is an edge view of the center wound capacitor of FIG. 13 after the leads have been wound 180°.
Figure 15:
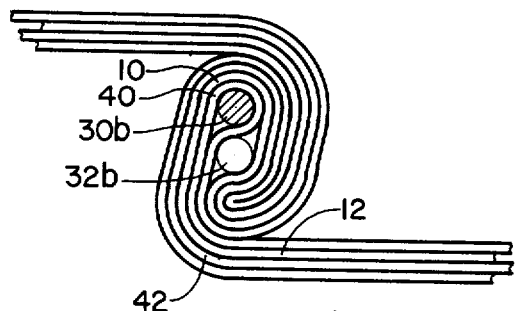
FIG. 15 is an edge view of the center wound capacitor of FIG. 13 after the winding has progressed 360°.

FIGS. 13 through 15 show a capacitor having the layer configuration of FIG. 9 where the capacitor is wound from the center on the leads 30b, 32b, which are shown with a dotted-line representation in FIG. 9. FIG. 14 shows the winding of the capacitor of FIG. 13 after the leads have rotated 180°, and FIG. 15 shows the capacitor winding after a 360° rotation of the leads has taken place.

As indicated herein, various different techniques may be utilized to produce the described structure. Thus, it will be understood that the above-described embodiments of the invention are for purposes of illustration only, and that modifications thereof may be made without departing from the spirit and scope of the invention.

The invention is claimed as follows:

1. A wound capacitor comprising a first elongated initially substantially flat dielectric layer having upper and lower surfaces and a pair of elongated edge surfaces and a second initially substantially flat elongated dielectric layer of approximately the same size as said first layer positioned below said first layer, said second layer also having upper and lower surfaces and a pair of elongated edge surfaces, a first metallized portion of said first dielectric layer extending over a part of the upper surface of said first layer, over a first one of said pair of elongated edges of said first layer and over a part of the lower surface of said first layer, a second metallized portion extending over a part of the upper surface of said first layer over the second one of said pair of elongated edges of said first layer and over a part of the lower surface of said first layer, said first and second metallized portions being electrically isolated by a first elongated strip on said upper surface of said first layer and a second elongated strip on said lower surface of said first layer, a third metallized portion on said second layer extending over a part of the upper surface of said second layer, over a first one of said pair of elongated edges of said second layer which lies below said second one of said elongated edges of said first layer and over a part of the lower surface of said second layer so that the upper surfaces of said first and third metallized portions overlap, a fourth metallized portion extending over a part of the upper surface of said second layer, over the second one of said pair of elongated edges of said second layer and over a part of the lower surface of said second layer so that the lower surfaces of said second and fourth metallized portions overlap, said third and fourth metallized portions of said second layer being electrically isolated by a third elongated dielectric strip on said upper surface of said second layer and a fourth dielectric strip on said lower surface of said second layer, said first strip being positioned in alignment with said fourth strip adjacent one edge of said dielectric layers and said second strip being positioned in alignment with said third strip adjacent the opposite edge of said dielectric layers, a first electricl lead having a contact portion positioned in contact with said first metallized portion of said first layer on the upper surface thereof and a second elongated electrical lead having a contact portion positioned intermediate said first and second layers so as to contact said second metallized portion of said first dielectric layer on the lower surface thereof and said third metallized portion of said second dielectric layer on the upper surface thereof, said first and second leads being wound about each other so as to form a roll comprising said first and second dielectric layers with the contact portion of said leads being secured in said roll.

2. A wound capacitor comprising first and second initially substantially flat elongated dielectric layers of approximately the same size, each of said first and second layers having an upper surface and a lower surface, a pair of elongated edge surfaces, a first metallized portion which extends over a part of said upper surface of said layers, over a first one of said pair of elongated edges of said layers and over a part of the lower surface of said layers and a second metallized portion which extends over a part of the upper surface of said layers, over the other one of said pair of elongated edges of said layers and over a part of the lower surface of said layers, a first dielectric strip on the upper surface of said layers which electrically isolates said first and second metallized portions of each of said layers, a second elongated dielectric strip on the lower surface of each of said layers which electrically isolates said first and second metallized portions, said first and second metallized portions being located so that the upper surface of said first metallized portions overlap each other and so that the lower surfaces of said metallized portions overlap each other, said elongated strips on the upper surfaces of said layers being in alignment with each other adjacent one of said elongated edges of said layers and the elongated strips on the lower surfaces of said layers being in alignment with each other adjacent the other one of said elongated edges of said layers, a third initially substantially flat dielectric layer of approximately the same size as said first and second layers having upper and lower surfaces and a pair of elongated edge surfaces, a third metallized portion on said third layer which extends over a first one of said pair of elongated edges of said third layer and over a relatively small part of the upper and lower surfaces of said third layer, a fourth metallized portion on said third dielectric layer which extends over the other one of said pair of elongated edges of said third layer and a relatively small part of the upper and lower surfaces of said third layer, the edge of said third layer which is covered by said fourth metallized portion being positioned under and adjacent to the edge of said first and second layers which are adjacent said first dielectric strips, a fourth initially substantially flat dielectric layer of approximately the same size as said first and second layer, said layers being positioned so that said second dielectric layer is intermediate said third and fourth dielectric layers and said third dielectric layer is intermediate said first and second dielectric layers, said fourth dielectric layer having upper and lower surfaces and a pair of elongated edge surfaces, a fifth metallized portion on said fourth layer which extends over a first one of said pair of elongated edges of said fourth layer and over a relatively small part of the upper and lower surfaces of said fourth layer, a sixth metallized portion on said fourth layer which extends over the other one of said pair of elongated edges of said fourth layer and over a relatively small part of the upper and lower surfaces of said fourth layer, a first electrical lead having a contact portion positioned in contact with said first metallized portion on the upper surface of said first layer and a second electrical lead having a contact portion positioned in contact with the lower surface of said metallized portion of said first layer and with the upper surface of said fourth metallized portion of said third layer, said first and second leads being wound about each other so as to form a roll comprising said first, second, third and fourth dielectric layers with the contact portions of said leads being secured in said roll.

* * * * *